United States Patent
Otsuki

(10) Patent No.: US 11,175,240 B2
(45) Date of Patent: Nov. 16, 2021

(54) INSPECTION APPARATUS AND INSPECTION METHOD

(71) Applicant: SCREEN HOLDINGS CO., LTD., Kyoto (JP)

(72) Inventor: Shohei Otsuki, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/649,090

(22) PCT Filed: May 10, 2018

(86) PCT No.: PCT/JP2018/018034
§ 371 (c)(1),
(2) Date: Mar. 19, 2020

(87) PCT Pub. No.: WO2019/058627
PCT Pub. Date: Mar. 28, 2019

(65) Prior Publication Data
US 2021/0164914 A1  Jun. 3, 2021

(30) Foreign Application Priority Data

Sep. 25, 2017 (JP) .............................. JP2017-183286

(51) Int. Cl.
*G01N 21/95* (2006.01)
*G01N 21/88* (2006.01)

(52) U.S. Cl.
CPC .......... *G01N 21/95* (2013.01); *G01N 21/8806* (2013.01); *G01N 2021/888* (2013.01); *G01N 2021/8887* (2013.01)

(58) Field of Classification Search
CPC .......................... G01N 21/95; G01N 21/8806
(Continued)

(56) References Cited

U.S. PATENT DOCUMENTS

2004/0076322 A1* 4/2004 Guetta ............... G01N 21/9501
382/145
2004/0195258 A1  10/2004 Hara et al.
(Continued)

FOREIGN PATENT DOCUMENTS

CN      1525143 A    9/2004
CN    101978253 A    2/2011
(Continued)

OTHER PUBLICATIONS

Japanese Office Action issued in corresponding Japanese Patent Application No. 2017-183286, dated Mar. 24, 2020, with Engish translation.
(Continued)

*Primary Examiner* — Hung Nguyen
(74) *Attorney, Agent, or Firm* — McDermott Will & Emery LLP

(57) ABSTRACT

An inspection apparatus includes: an upstream imaging mechanism that images an upstream wall surface extending from a bottom part of a recess upstream of and adjacent to a projection in a rotating direction of a workpiece to a tip of the projection; and a downstream imaging mechanism that images a downstream wall surface extending from a bottom part of the recess downstream of and adjacent to the projection in the rotating direction to the tip of the projection. At least one of the imaging mechanisms includes a mover for parallelly moving and positioning in an orthogonal plane orthogonal to the axis of symmetry and images the workpiece from a position radially outward of the workpiece and positioned by the mover.

10 Claims, 11 Drawing Sheets

(58) Field of Classification Search
USPC .......................................... 356/237.1–237.3
See application file for complete search history.

(56) References Cited

U.S. PATENT DOCUMENTS

| | | |
|---|---|---|
| 2005/0000051 A1 | 1/2005 | Pahk et al. |
| 2005/0122509 A1* | 6/2005 | Backhauss ......... G01N 21/8806 356/237.2 |
| 2007/0188859 A1* | 8/2007 | Tokita .................... G03F 9/7026 359/394 |
| 2011/0057373 A1 | 3/2011 | Sueoka et al. |
| 2012/0033068 A1 | 2/2012 | Takahashi |
| 2012/0069173 A1 | 3/2012 | Takahashi et al. |
| 2013/0194579 A1* | 8/2013 | Mohara ................ G01N 21/956 356/450 |
| 2015/0329297 A1 | 11/2015 | Makino et al. |

FOREIGN PATENT DOCUMENTS

| | | |
|---|---|---|
| CN | 104254758 A | 12/2014 |
| DE | 4142676 A1 | 7/1993 |
| DE | 19718494 A1 | 11/1998 |
| EP | 2 891 878 A1 | 7/2015 |
| EP | 3 598 111 A1 | 1/2020 |
| JP | 05-157705 A | 6/1993 |
| JP | 10-132537 A | 5/1998 |
| JP | 2000-065749 A | 3/2000 |
| JP | 2005-514607 A | 5/2005 |
| JP | 2008-032487 A | 2/2008 |
| JP | 2012-039350 A | 2/2012 |
| JP | 2012-063268 A | 3/2012 |
| JP | 2014-115222 A | 6/2014 |
| JP | 2018-151242 A | 9/2018 |
| TW | 201713935 A | 4/2017 |

OTHER PUBLICATIONS

International Search Report issued in corresponding International Patent Application No. PCT/JP2018/018034, dated Jul. 17, 2018, with English translation.
Japanese Notice of Reasons for Refusal issued in corresponding Japanese Patent Application No. 2017-183286, dated Aug. 27, 2018, with English translation.
Taiwanese Office Action issued in corresponding Taiwanese Patent Application No. 107117738, dated Oct. 15, 2018.

* cited by examiner

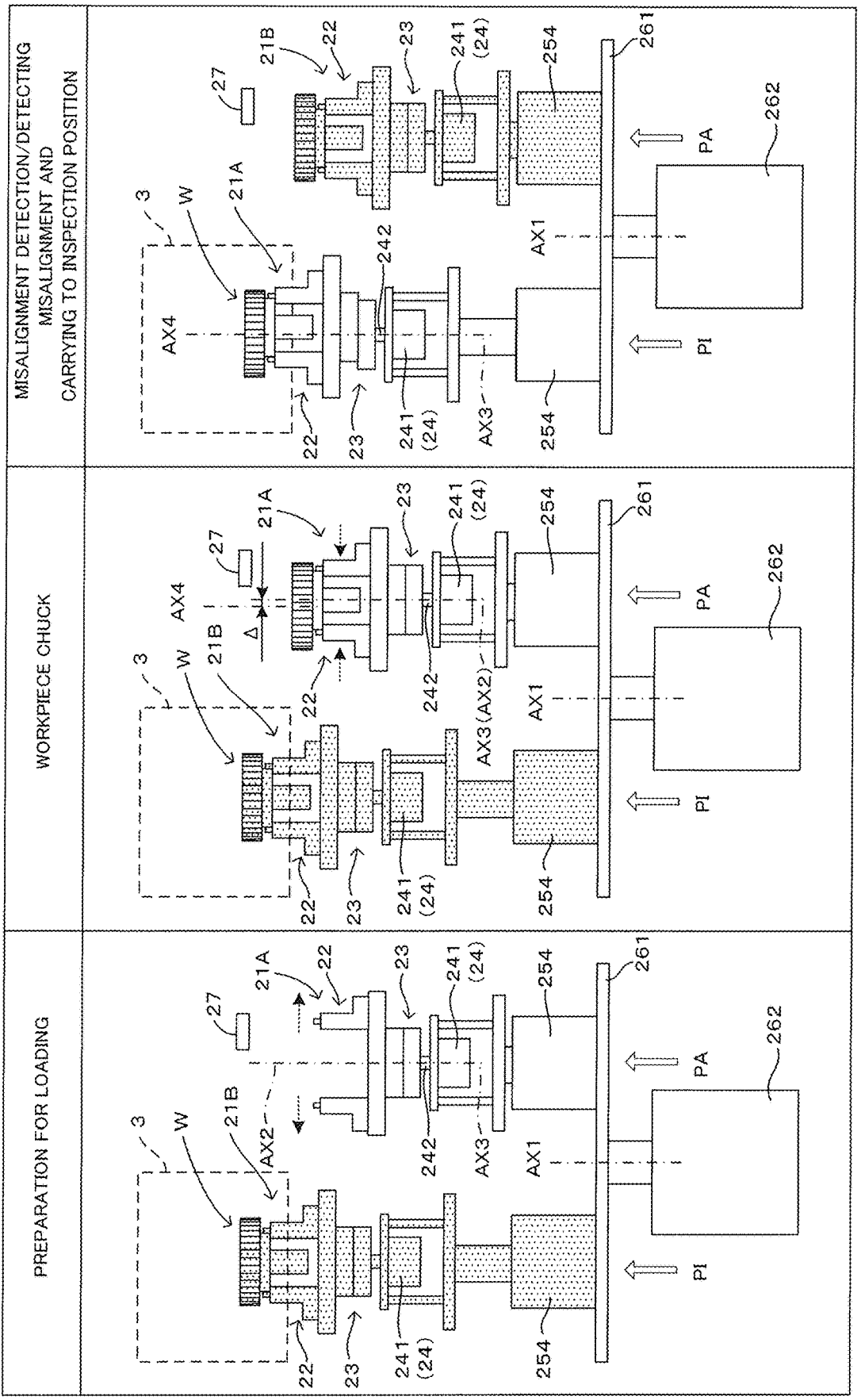

INSPECTION APPARATUS AND INSPECTION METHOD

CROSS REFERENCE TO RELATED APPLICATIONS

This application is the U.S. National Phase under 35 US.C. § 371 of International Application No. PCT/JP2018/018034, filed on May 10, 2018, which claims the benefit of Japanese Application No. 2017-183286, filed on Sep. 25, 2017, the entire contents of each are hereby incorporated by reference.

TECHNICAL FIELD

This invention relates to an inspection apparatus and an inspection method for inspecting a workpiece including an outer peripheral part which has a rotationally symmetric shape about an axis of symmetry and in which projections and recesses are cyclically repeatedly provided.

Contents disclosed in the specification, drawings and claims of the following Japanese Patent Application are all incorporated herein by reference.

Japanese Patent Application No. 2017-183286 (filed on Sep. 13, 2017)

BACKGROUND ART

A workpiece inspection apparatus described in patent literature 1 is known as an example of an apparatus for inspection of the appearance of a workpiece rotationally symmetric about a symmetry axis. In the workpiece inspection apparatus, the workpiece is held by a holder unit connected to a motor. While the workpiece is rotated by the motor, multiple cameras capture images of the workpiece and the appearance of the workpiece are inspected on the basis of the images captured by the cameras.

CITATION LIST

Patent Literature

[Patent Literature 1] JP 2012-63268 A

SUMMARY OF INVENTION

Technical Problem

In the apparatus described in the patent literature 1, a gear is handled as a workpiece and whether or not a scratch, a deflect or the like is present in the gear is inspected. This apparatus is provided with a total of three cameras including a tooth surface imaging camera for imaging a tooth surface from a side radially outward of the workpiece, a tooth tip imaging camera for imaging a tooth tip from a side radially outward of the workpiece and an end surface imaging camera for imaging the tooth tip from a side vertically above the workpiece. A so-called area camera is used as the tooth surface imaging camera, out of these cameras, and so installed and set (lens selection, magnification, etc.) to capture an image including at least two or more tooth parts.

In the tooth part of the gear, two tooth surfaces are formed in a rotating direction of the gear. One of those is a tooth surface from the tip of a tooth end (tooth tip) toward a tooth base on an upstream side in the rotating direction (hereinafter, referred to as an "upstream tooth surface") and the other is a tooth surface formed toward a tooth base on a downstream side in the rotating direction (hereinafter, referred to as a "downstream tooth surface"). In the above apparatus described in patent literature 1, the tooth surface imaging camera collectively images not only the tooth end and the tooth base, but also the upstream tooth surface and the downstream tooth surface, and obtains an image representing the entire surface of the tooth part by this imaging. Thus, it may be difficult to obtain information necessary to precisely inspect the upstream tooth surface and the downstream tooth surface. Further, it may also become difficult to image the upstream tooth surface and the downstream tooth surface depending on the shape and type of the gear. Such problems occur also in the case of inspecting a workpiece having similar features as the gear, i.e. a workpiece including an outer peripheral part which has a rotationally symmetric shape about an axis of symmetry and in which projections and recesses are cyclically repeatedly provided, by the apparatus described in patent literature 1.

This invention was developed in view of the above problems and aims to provide an inspection technique capable of highly accurately inspecting a workpiece including an outer peripheral part which has a rotationally symmetric shape about an axis of symmetry and in which projections and recesses are cyclically repeatedly provided.

Solution to Problem

One aspect of the invention is an inspection apparatus that inspects a workpiece including an outer peripheral part which has a rotationally symmetric shape about an axis of symmetry and in which projections and recesses are cyclically repeatedly provided, the apparatus comprising: a holding table that rotates the workpiece about an axis of rotation with the axis of symmetry caused to coincide with the axis of rotation while holding the workpiece; a tip imaging mechanism that images a tip of the projection of the workpiece in rotation; an upstream imaging mechanism that images an upstream wall surface extending from a bottom part of the recess upstream of and adjacent to the projection in a rotating direction of the workpiece to the tip of the projection; a downstream imaging mechanism that images a downstream wall surface extending from a bottom part of the recess downstream of and adjacent to the projection in the rotating direction to the tip of the projection; and an inspection unit that inspects the workpiece based on images captured by the tip imaging mechanism, the upstream imaging mechanism and the downstream imaging mechanism, wherein at least one of the upstream imaging mechanism and the downstream imaging mechanism including a mover for parallelly moving and positioning the imaging mechanism in an orthogonal plane orthogonal to the axis of symmetry and imaging the workpiece from a position radially outward of the workpiece and positioned by the mover.

Other aspect of the invention is an inspection method for inspecting a workpiece including an outer peripheral part which has a rotationally symmetric shape about an axis of symmetry and in which projections and recesses are cyclically repeatedly provided, the method comprising: a rotating step of rotating the workpiece about an axis of rotation with the axis of symmetry caused to coincide with the axis of rotation while holding the workpiece; a positioning step of parallelly moving and positioning at least one of an upstream imaging mechanism for imaging an upstream wall surface extending from a bottom part of the recess upstream of and adjacent to the projection in a rotating direction of the workpiece to a tip of the projection and a downstream imaging mechanism for imaging a downstream wall surface extending from a bottom part of the recess downstream of and adjacent to the projection in the rotating direction to the tip of the projection in an orthogonal plane orthogonal to the axis of symmetry on a side radially outward of the workpiece; an image obtaining step of, after the positioning step, obtaining a tip image by imaging the tip of the projection of the workpiece rotating about the axis of rotation by a tip imaging mechanism, obtaining an upstream wall surface image by imaging the upstream wall surface extending from the bottom part of the recess upstream of and adjacent to the projection in the rotating direction of the workpiece to the tip of the projection by the upstream imaging mechanism, and obtaining a downstream wall surface image by imaging the downstream wall surface extending from the bottom part of the recess downstream of and adjacent to the projection in the rotating direction to the tip of the projection by the downstream imaging mechanism; and an inspecting step of inspecting the workpiece based on the tip image, the upstream wall surface image and the downstream wall surface image.

In the invention thus configured, the dedicated tip imaging mechanism, upstream imaging mechanism and downstream imaging mechanism are respectively provided to image the tip, upstream wall surface and downstream wall surface of the projection of the workpiece. Particularly, at least one of the upstream imaging mechanism and the downstream imaging mechanism includes the mover for parallelly moving and positioning the imaging mechanism in the orthogonal plane orthogonal to the axis of symmetry, and images the workpiece from the position radially outward of the workpiece and positioned by the mover. Then, the tip image, the upstream wall surface image and the downstream wall surface image are individually obtained, and the workpiece is inspected based on these images.

Advantageous Effects of Invention

As described above, since a workpiece is inspected based on images obtained by imaging a tip, an upstream wall surface and a downstream wall surface of a projection of the workpiece respectively by the tip imaging mechanism, the upstream imaging mechanism and the downstream imaging mechanism according to the invention, various workpiece s can be highly accurately inspected. Particularly, since at least one of the upstream imaging mechanism and the downstream imaging mechanism includes the mover for parallelly moving and positioning the imaging mechanism in the orthogonal plane orthogonal to the axis of symmetry, a case where a diameter of the workpiece is changed and a case where imaging conditions are changed as described in detail later can be properly dealt with and versatility is high.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

BRIEF DESCRIPTION OF DRAWINGS

FIGS. 10A-10C schematically show the inspecting operation.

DESCRIPTION OF EMBODIMENTS

Figure 1:
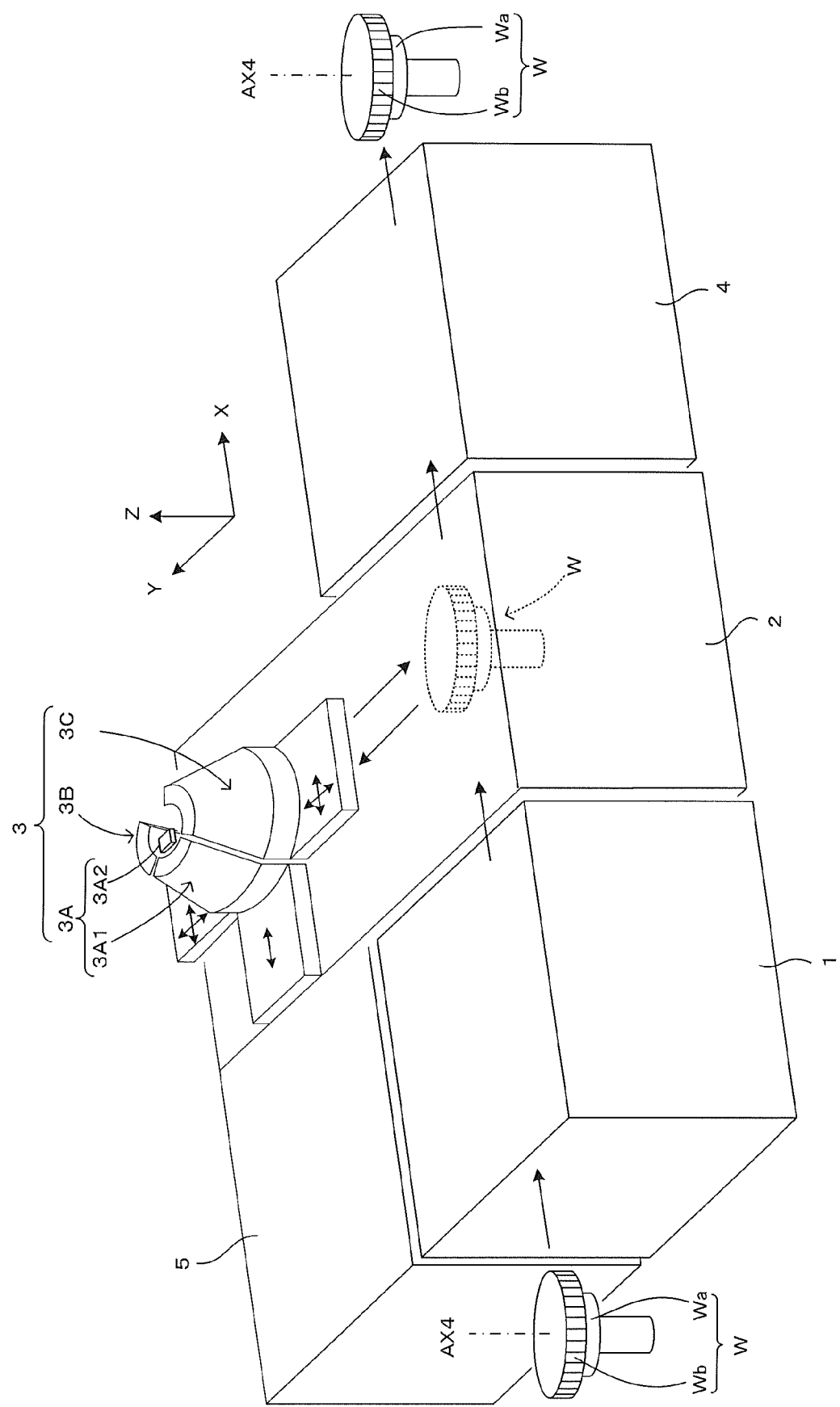
FIG. 1 shows the entire configuration of one embodiment of an inspection apparatus according to the present invention.
Figure 2:
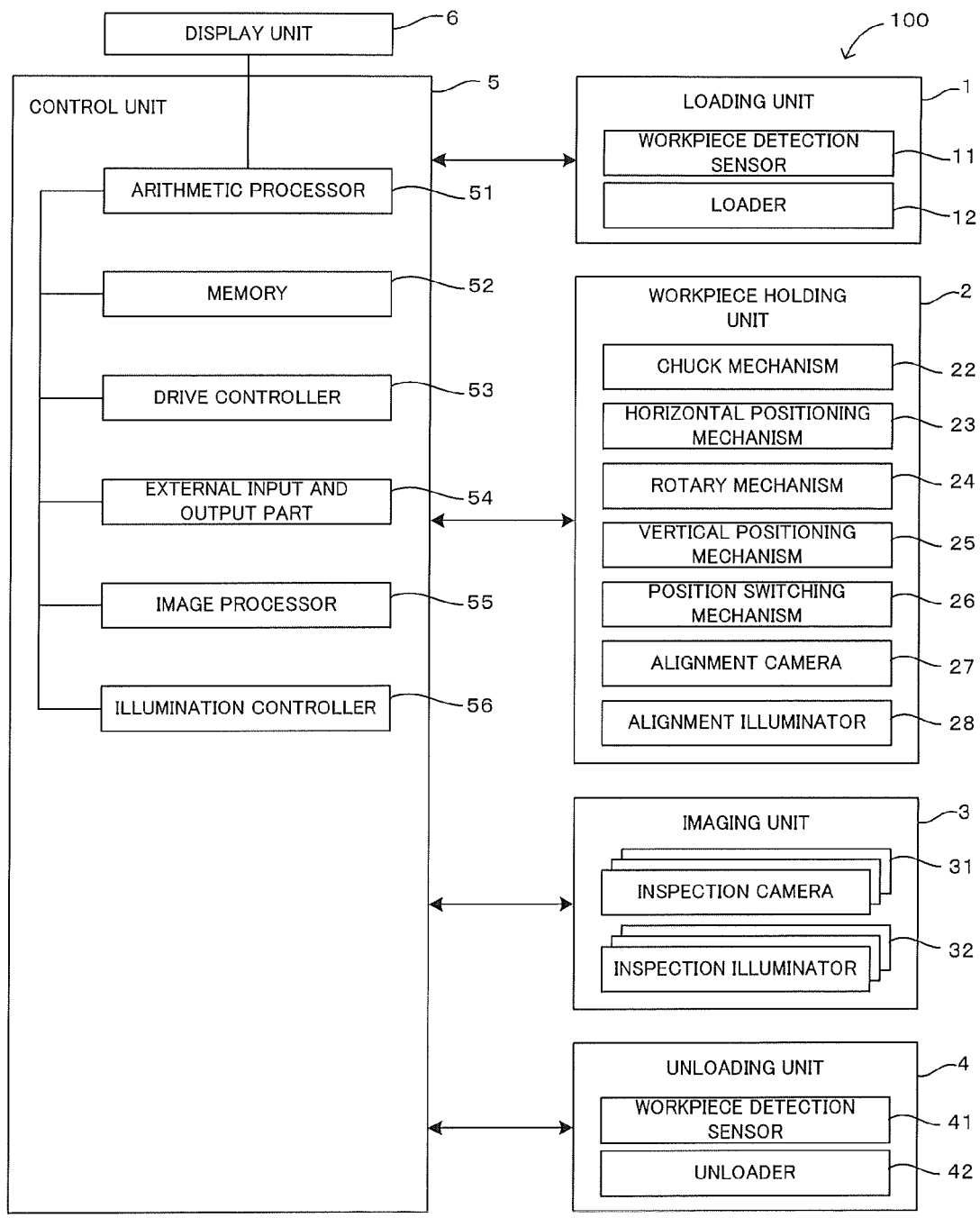
FIG. 2 is a block diagram showing the electrical configuration of the inspection apparatus shown in FIG. 1.

FIG. 1 shows the entire configuration of one embodiment of an inspection apparatus according to the present invention. FIG. 2 is a block diagram showing the electrical configuration of the inspection apparatus shown in FIG. 1. The inspection apparatus 100 is to inspect the appearance of a workpiece W such as a gear or an impeller having an outer peripheral portion of a rotationally symmetric shape about a symmetry axis with projections and recesses provided periodically and repeatedly. The inspection apparatus 100 includes a loading unit 1, a workpiece holding unit 2, an imaging unit 3, an unloading unit 4, and a control unit 5. As shown in FIG. 1, the workpiece W mentioned herein is a machine part with a shaft Wa and a gear Wb provided at the top of the shaft Wa and is formed by forging or casting, for example. After the part is manufactured, the workpiece W is carried to the loading unit 1 by an external transfer robot or an operator.

The loading unit 1 includes a workpiece housing (not shown in the drawings) such as a table or a storage locker. When a workpiece W is temporarily housed into the workpiece housing by the external transfer robot, for example, a workpiece detection sensor 11 (FIG. 2) at the workpiece housing detects the workpiece W, and transmits a signal indicating the detection to the control unit 5 responsible for control of the apparatus entirely. The loading unit 1 includes a loader 12 (FIG. 2). In response to an operation command from the control unit 5, the loading unit 1 receives an uninspected workpiece W in the workpiece housing and carries the uninspected workpiece W to the workpiece holding unit 2.

Figure 3:
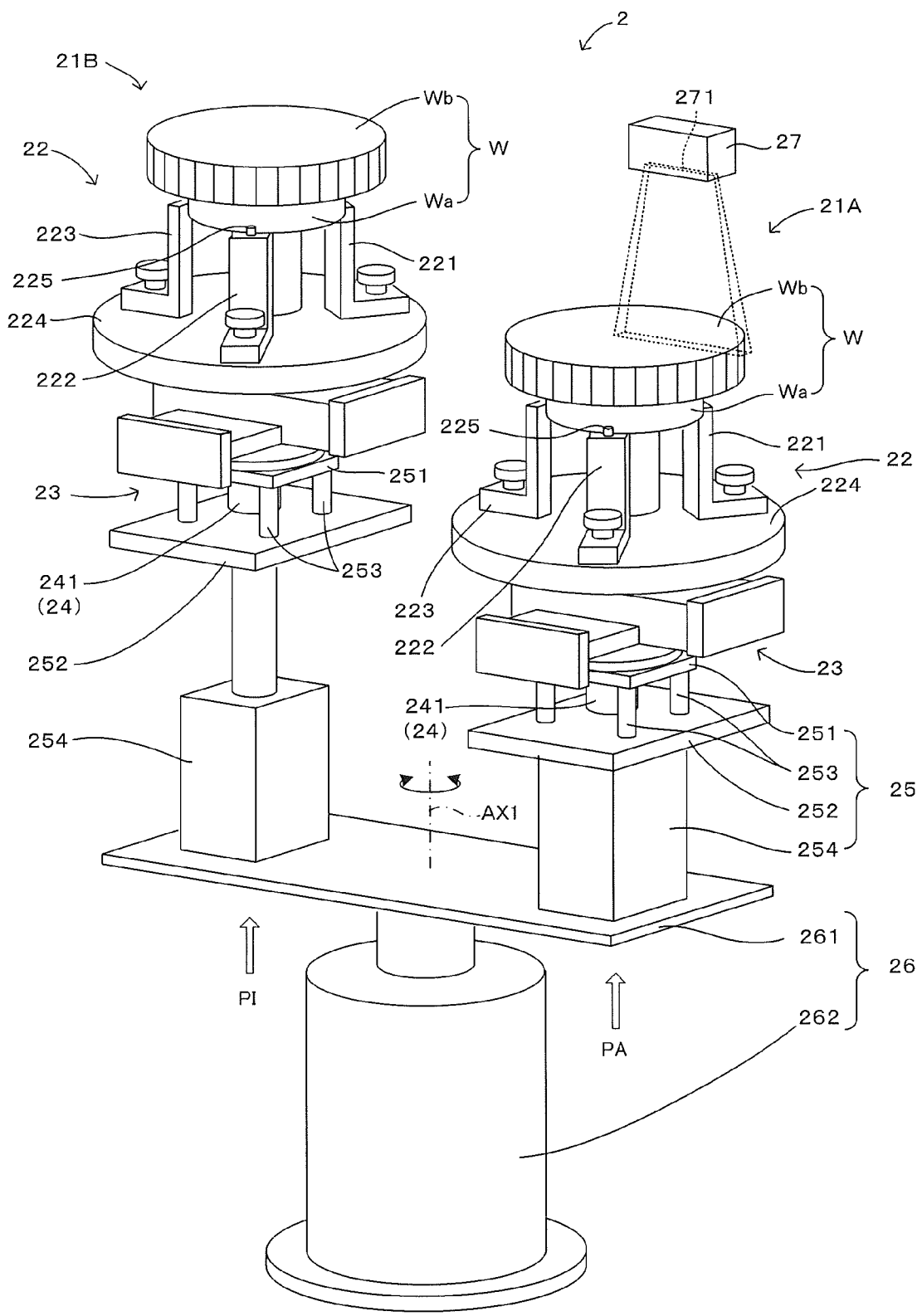
FIG. 3 is a perspective view showing the configuration of the workpiece holding unit.

FIG. 3 is a perspective view showing the configuration of the workpiece holding unit. The workpiece holding unit 2 is equipped with a holding table 21A and a holding table 21B for holding the workpiece W carried by the loader 12. The holding tables 21A and 21B have the same configuration and can hold the workpiece W by grasping a part of the shaft Wa of the workpiece W in a posture in which the gear Wb is in a horizontal position. The configuration of the holding table 21A will be described below by referring to FIG. 3. Meanwhile, as the holding table 21B has the same configuration as the holding table 21A, the holding table 21B will be given the same signs as the holding table 21A and will not be described.

As shown in FIG. 3, the holding table 21A includes a chuck mechanism 22, a horizontal positioning mechanism 23, a rotary mechanism 24, and a vertical positioning mechanism 25 stacked in the vertical direction. The chuck mechanism 22 includes movable members 221 to 223 substantially L-shaped in a side view, and a moving part 224 that moves the movable members 221 to 223 in conjunction with each other in a radial pattern in response to a movement command from the control unit 5. Each of the movable members 221 to 223 has an upper end surface where a projection member 225 is provided, and can be engaged with a stepped part of the shaft Wa using the upper end surface and the projection member 225. Thus, by moving the movable members 221 to 223 to get closer to each other using the moving part 224 in response to a grasp command from the control unit 5, it becomes possible to hold a workpiece W with the center axis of the chuck mechanism 22 (sign AX2 in FIGS. 10A-10C) and the axis of the shaft Wa matched with each other. Meanwhile, by moving the movable members 221 to 223 to get away from each other using the moving part 224 in response to a release command from the control unit 5, it becomes possible to load an uninspected workpiece W using the loading unit 1 or unload an inspected workpiece W using the unloading unit 4.

The chuck mechanism 22 having the foregoing configuration is supported by the horizontal positioning mechanism 23. The horizontal positioning mechanism 23 includes what is called as an XY table for movements in directions orthogonal to each other in the horizontal direction. Thus, driving the XY table in response to a movement command from the control unit 5 allows high-accuracy positioning of the chuck mechanism 22 on a horizontal plane. Note that, as the XY table, a member using a motor and a ball screw mechanism in combination or a member using two linear motors in combination orthogonal to each other in the horizontal direction is applicable, for example.

The rotary mechanism 24 includes a motor 241. A rotary shaft (sign 242 in FIG. 10) of the motor 241 extends vertically upwardly. The horizontal positioning mechanism 23 is connected to the upper end of the rotary shaft. Thus, when a rotation command is given from the control unit 5, the motor 241 is actuated to rotate the horizontal positioning mechanism 23, the chuck mechanism 22, and a workpiece W grasped by the chuck mechanism 22 integrally about the rotary axis (sign AX3 in FIGS. 10A-10C) of the motor 241.

In the embodiment, the horizontal positioning mechanism 23 is provided between the chuck mechanism 22 and the rotary mechanism 24, and this has a technical significance of making the respective positions of the axis of the chuck mechanism 22, the symmetry axis (sign AX4 in FIGS. 10A-10C) of the gear Wb of the workpiece W grasped by the chuck mechanism 22, and the rotary axis of the motor 241 relative to each other adjustable using the horizontal positioning mechanism 23. More specifically, matching the center axis of the chuck mechanism 22 and the rotary axis of the motor 241 with each other allows the workpiece W grasped by the chuck mechanism 22 to rotate about the shaft Wa. In the presence of displacement of the symmetry axis of the gear Wb from the shaft Wa, however, misalignment thereof with respect to the motor 241 occurs to cause unintentional eccentric rotation of the gear Wb. In response to this, the horizontal positioning mechanism 23 is provided to achieve drive so as to correct the amount of the displacement and a direction of the displacement. By doing so, the symmetry axis of the gear Wb and the rotary axis of the motor 241 can be matched with each other. This allows capturing of an image of the gear Wb with high accuracy by the imaging unit 3. As a result, the workpiece W can be inspected with higher accuracy.

The vertical positioning mechanism 25 includes a holding plate 251 holding the motor 241, a base plate 252 arranged below the motor 241, four connecting pins 253 connecting the holding plate 251 and the base plate 252, and an elevator 254 for moving the base plate 252 up and down in the vertical direction. The elevator 254 moves the base plate 252 up and down in response to an up-down command from the control unit 5 to move the rotary mechanism 24, the horizontal positioning mechanism 23, and the chuck mechanism 22 integrally in the vertical direction. By doing so, a workpiece W can be located at an appropriate height position at a pre-alignment position PA and an inspection position PI described next.

As shown in FIG. 3, the holding tables 21A and 21B having the foregoing configuration are fixed on a support plate 261 while being separated by a certain distance. The support plate 261 is supported by a turning driver 262 at an intermediate position between the holding tables 21A and 21B. The turning driver 262 can make the support plate 261 turn 180 degrees about a turning axis AX1 extending in the vertical direction in response to a turning command from the control unit 5. As shown in FIG. 3, the turning driver 262 can make a switch between a first position at which the holding tables 21A and 21B are located at the pre-alignment position PA and the inspection position PI respectively, and a second position at which the holding tables 21A and 21B are located at the inspection position PI and the pre-alignment position PA respectively. For example, in parallel with pre-alignment process on a workpiece W held by the holding table 21A at the pre-alignment position PA, the turning driver 262 makes a switch from the first position to the second position to shift the holding table 21A from the pre-alignment position PA to the inspection position PI. By doing so, the workpiece W after being subjected to the pre-alignment process can be located at the inspection position PI. After inspection of this workpiece W is finished, a turn is made in the opposite direction to shift the holding table 21A from the inspection position PI to the pre-alignment position PA. By doing so, the workpiece W after being subjected to the inspection process can be located at the pre-alignment position PA. In this way, in the embodiment, the support plate 261 and the turning driver 262 form a position switching mechanism 26 for switching the position of the workpiece W.

As described above, the pre-alignment position PA is a position for the pre-alignment process. An alignment camera 27 is arranged above the holding table 21A (or 21B) located at the pre-alignment position PA. As shown in FIG. 3, the alignment camera 27 is arranged on the opposite side of the motor 241 with respect to a workpiece W, namely, above the workpiece W. The alignment camera 27 includes a line sensor 271 extending radially outwardly from the symmetry axis AX4 of the workpiece W. This allows imaging of the upper surface of the workpiece W by the line sensor 271 while rotating the workpiece W. By rotating the workpiece W at least one turn, an image covering all the projections (teeth tips) and the recesses (teeth roots) at the outer peripheral portion of the gear Wb is acquired.

While not shown in FIG. 3, an alignment illuminator 28 (FIG. 2) is provided that illuminates a workpiece W held by the holding table 21A (or 21B) for performing the alignment process favorably. Thus, during capturing of an image of the workpiece W by the alignment camera 27, the workpiece W can be illuminated by the alignment illuminator 28 while the workpiece W is rotated by the rotary mechanism 24. Data about the image of the workpiece W is transmitted to the control unit 5 so that the misalignment is corrected to match the symmetry axis of the gear Wb and the rotary axis of the motor 241 with each other, that is, a pre-alignment process is performed.

The inspection position PI is a position at which the inspection process is performed. The imaging unit 3 is arranged above the holding table 21A (or 21B) located at the inspection position PI. At the inspection position PI, an image of a workpiece W can be captured by the imaging unit 3 while the workpiece W is rotated with the symmetry axis of the gear Wb and the rotary axis of the motor 241 matched with each other (see FIGS. 5 and 10A-10C described in later). Data about the image of the workpiece W is transmitted to the control unit 5 to perform the inspection process of inspecting the workpiece W for the presence or absence of scratches, defects, etc. at the gear Wb.

As shown in FIG. 2, the imaging unit 3 includes multiple inspection cameras 31 and multiple inspection illuminators 32. The inspection illuminators 32 of the imaging unit 3 are arranged so as to illuminate a workpiece W from various directions held by the holding table 21A (or 21B) located at the inspection position PI. Images of the workpiece W can be captured from various directions by the inspection cameras 31 while the workpiece W is rotated by the rotary mechanism 24 and the workpiece W is illuminated by the inspection illuminators 32. Multiple pieces of data about the captured images are transmitted to the control unit 5 and the workpiece W is inspected by the control unit 5. Note that the configuration and operation of the imaging unit 3 are described in detail later.

The holding table 21A (or 21B) holding the inspected workpiece W is shifted from the inspection position PI to the pre-alignment position PA by the position switching mechanism 26 as described above. Then, the inspected workpiece W is carried out of the holding table 21A (or 21B) by the unloading unit 4. The unloading unit 4 is basically the same as the loading unit 1. More specifically, the unloading unit 4 includes a workpiece housing (not shown in the drawings) for temporarily housing an inspected workpiece W, a workpiece detection sensor 41 (FIG. 2), and an unloader 42 (FIG. 2). In response to an operation command from the control unit 5, the unloading unit 4 carries the inspected workpiece W from the holding table 21A (21B) to the workpiece housing.

As shown in FIG. 2, the control unit 5 is composed of a well-known central processing unit (CPU) for implementation of logic operations, a read only memory (ROM) storing initial setting and others, a random access memory (RAM) for temporarily storing various types of data generated during operation of the apparatus, etc. The control unit 5 functionally includes an arithmetic processor 51, a memory 52, a drive controller 53, an external input and output part 54, an image processor 55, and an illumination controller 56.

The drive controller 53 controls drive of driven mechanisms such as the loader 12, the chuck mechanism 22 and movers installed imaging unit 3 provided at corresponding positions of the apparatus. The external input and output part 54 inputs signals from various types of sensors installed on corresponding positions of the apparatus, and outputs signals to various types of actuators, etc. installed on corresponding positions of the apparatus. The image processor 55 retrieves image data from the alignment camera 27 and the inspection camera 31 and performs image processing such as binarization. The illumination controller 56 controls turning-on, turning-off, etc. of the alignment illuminator 28 and the inspection illuminator 32.

The arithmetic processor 51 has an arithmetic function, and performs a sequence of processes described next by controlling the drive controller 53, the image processor 55, and the illumination controller 56 in accordance with a program stored in the memory 52.

A sign 6 shown in FIG. 2 means a display unit functioning as an interface with an operator. The display unit 6 is connected to the control unit 5 to fulfill the function of displaying an operating state of the inspection apparatus 100. Additionally, the display unit 6 is configured using a touch panel to fulfill a function as an input terminal to accept input from an operator. The display unit 6 is not limited to this configuration but can be configured using a display device for display of an operating state and input terminals such as a keyboard and a mouse.

Figure 4:
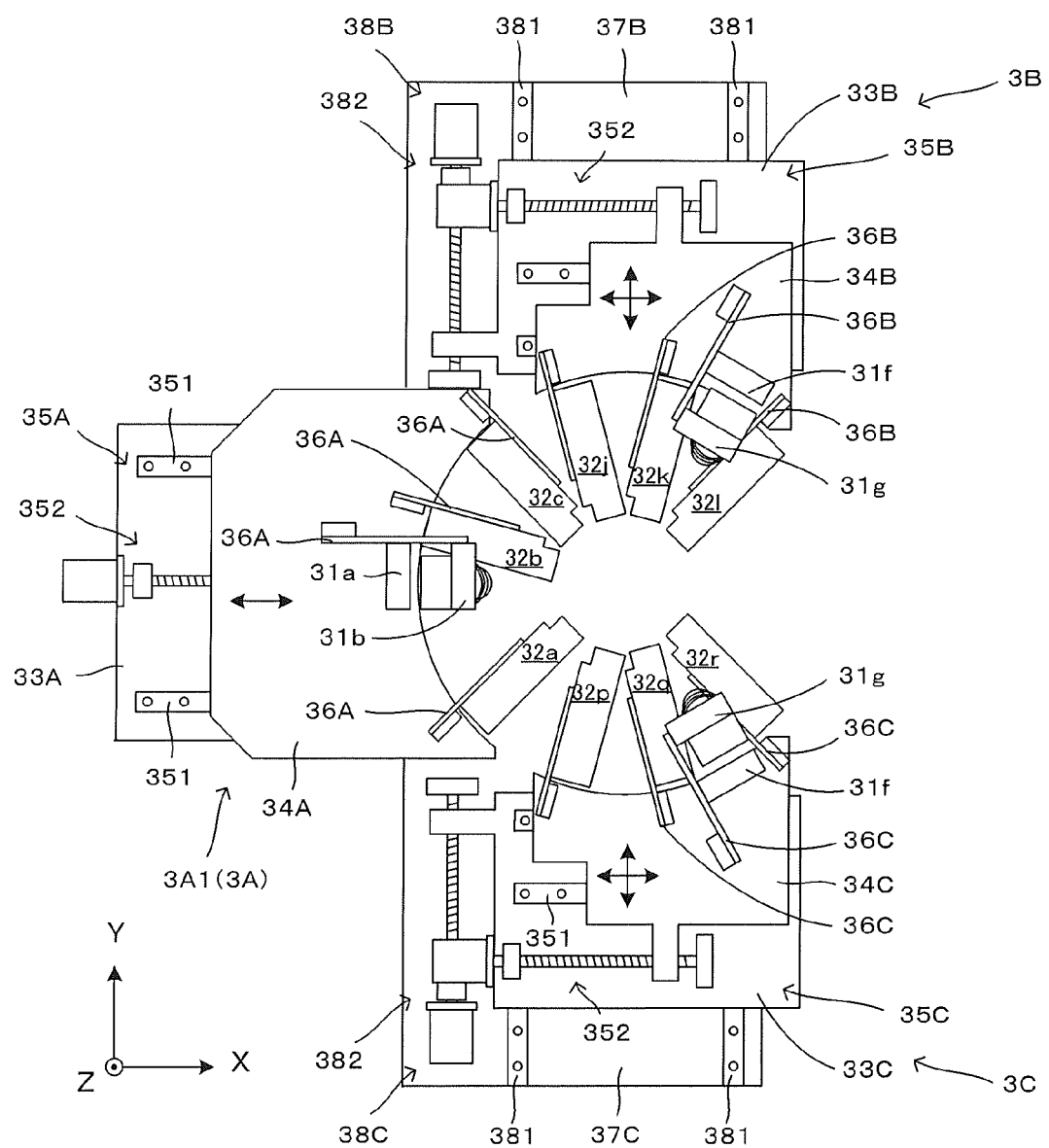
FIG. 4 is a top view of the imaging unit.
Figure 5:
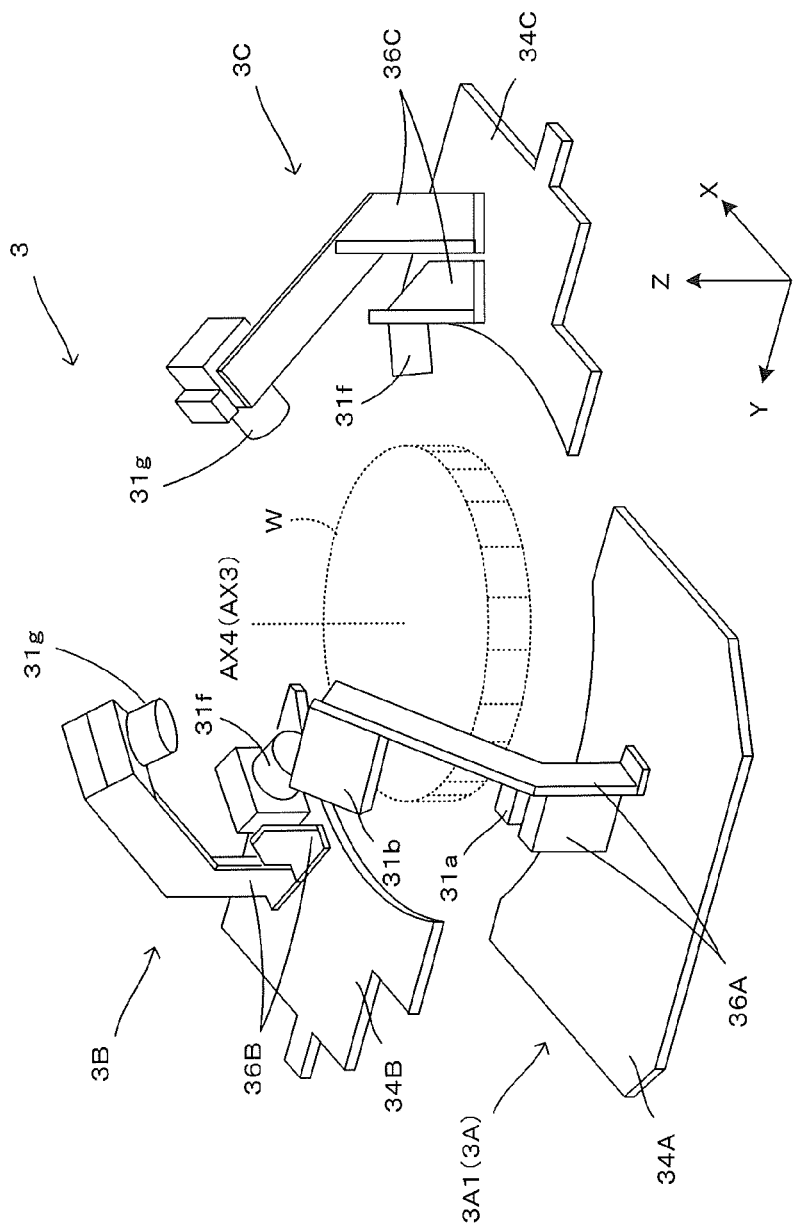
FIG. 5 is a perspective view showing the configuration of the imaging unit.
Figure 6A:
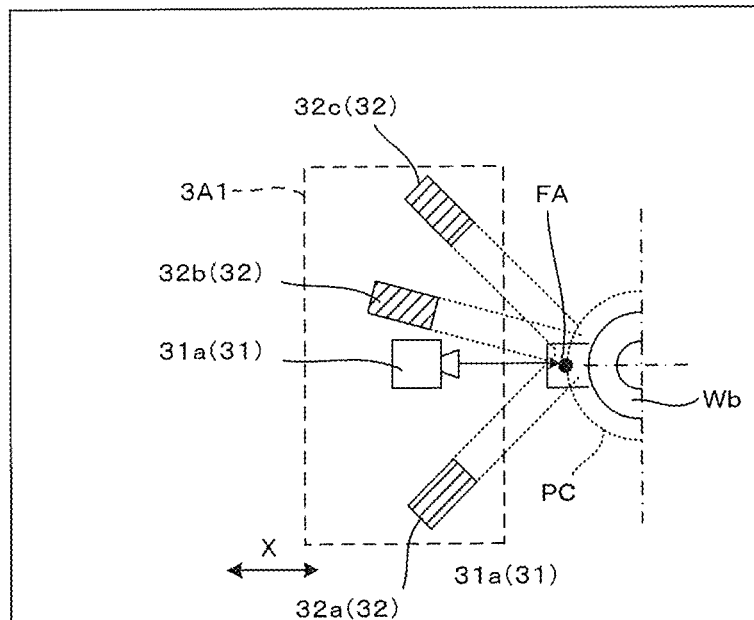
FIGS. 6A and 6B are views schematically showing arrangement relationships of the inspection cameras and the inspection illuminators for a gear in a tip imaging mechanism.
Figure 6B:
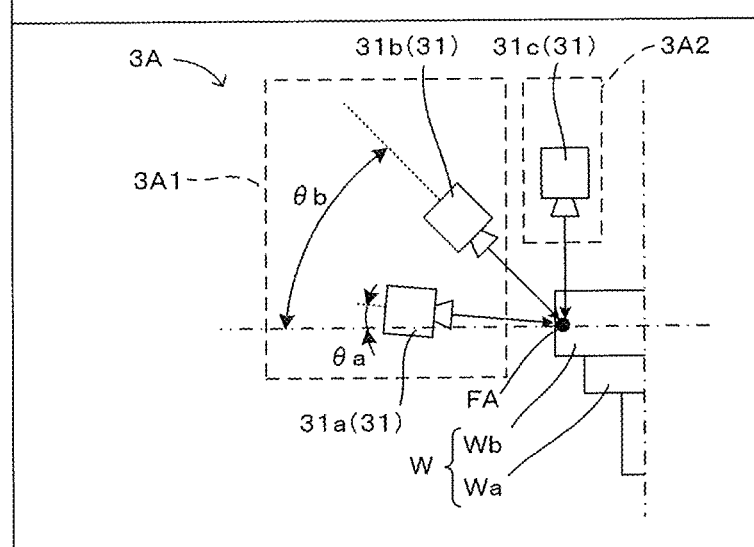
Figures 7A, 7B:
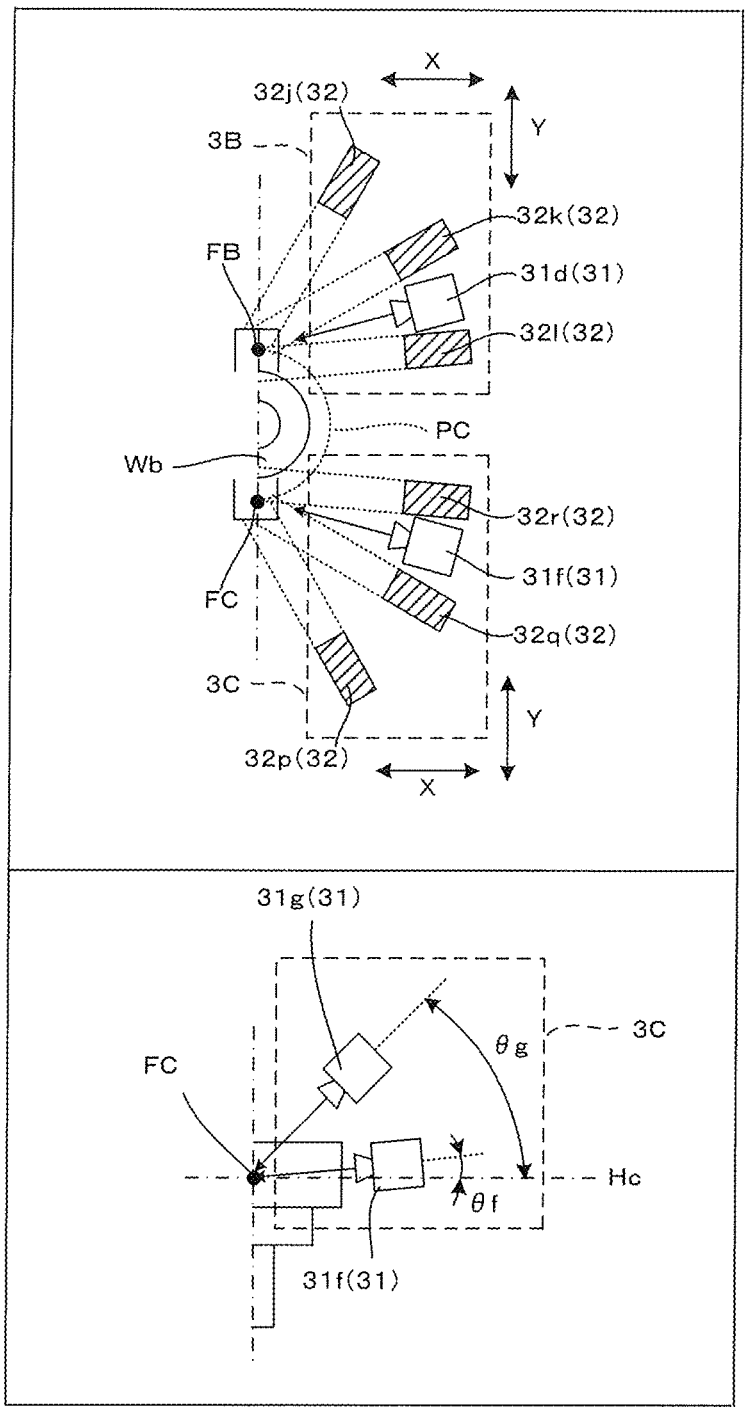
FIGS. 7A and 7B are views schematically showing an arrangement relationship of the inspection cameras and the inspection illuminators for the gear in an upstream imaging mechanism and a downstream imaging mechanism.
Figure 8:
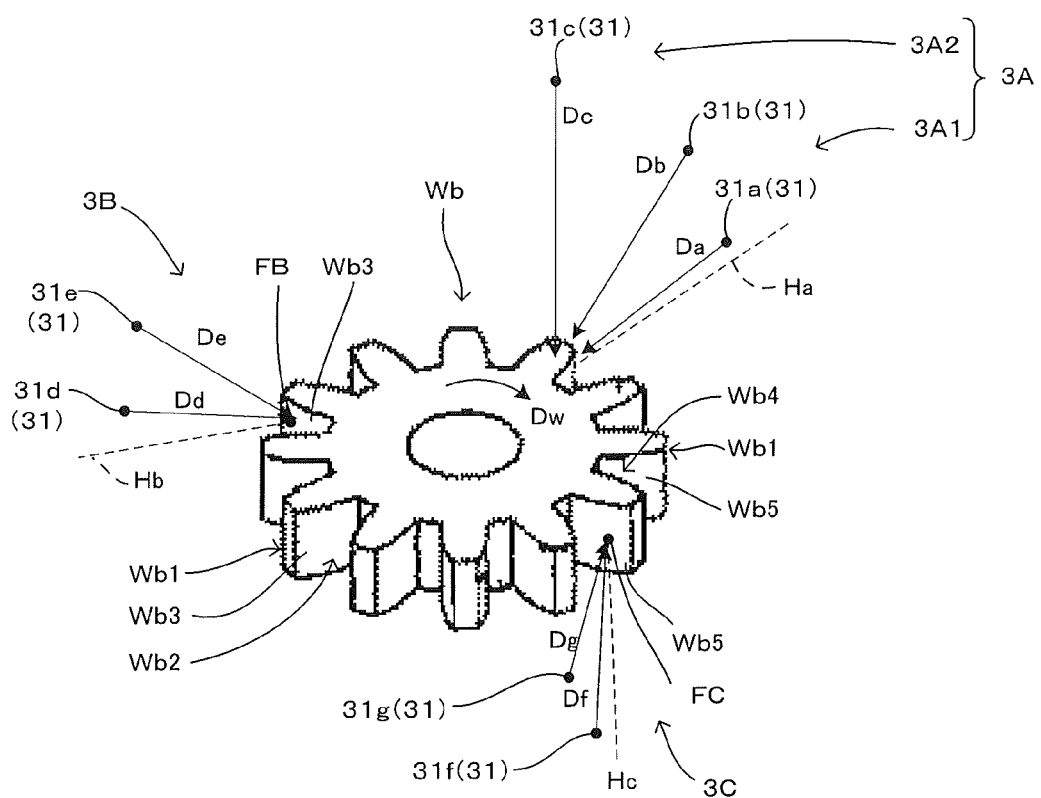
FIG. 8 is a view showing imaging directions of the inspection cameras for the gear.

Next, the configuration and operation of the imaging unit 3 are described with reference to FIGS. 1 and 4 to 8. FIG. 4 is a top view of the imaging unit. FIG. 5 is a perspective view showing the configuration of the imaging unit. FIGS. 6A and 6B are views schematically showing arrangement relationships of the inspection cameras and the inspection illuminators for a gear in a tip imaging mechanism. FIGS. 7A and 7B are views schematically showing an arrangement relationship of the inspection cameras and the inspection illuminators for the gear in an upstream imaging mechanism and a downstream imaging mechanism. FIG. 8 is a view showing imaging directions of the inspection cameras for the gear. As shown in FIG. 1, the imaging unit 3 includes a tip imaging mechanism 3A, an upstream imaging mechanism 3B and a downstream imaging mechanism 3C and can image each part of a gear Wb of a workpiece W rotating in a predetermined rotating direction Dw while being held on the holding table 21A (or 21B).

The tip imaging mechanism 3A spot-illuminates a predetermined illumination area from multiple directions by nine inspection illuminators 32, images a tip part of a tooth part located in the illumination area, out of a gear Wb of a workpiece W, i.e. a tooth end Wb1 (see FIG. 8) from multiple directions by three inspection cameras 31 and sends image data of images of the tooth end Wb1 (hereinafter, referred to as "tip images") to the control unit 5. More particularly, as shown in FIG. 1, the tip imaging mechanism 3A includes a movable tip imaging mechanism 3A1 provided to be able to integrally move the plurality of inspection cameras 31 and the plurality of inspection illuminators 32 and configured to image the tooth end Wb1 from oblique directions, and a fixed tip imaging mechanism 3A2 having one inspection camera 31 fixed vertically above the gear Wb and configured to image the tooth end Wb1 from vertically above. In FIG. 4, the fixed tip imaging mechanism 3A2 is not shown to clarify arrangement relationships of the inspection cameras 31 and the inspection illuminators 32 in the imaging mechanisms 3A1, 3B and 3C excluding the fixed tip imaging mechanism 3A2. Further, in FIG. 5, movers 35A to 35C, 38B and 38C (FIG. 4) for moving the imaging mechanisms 3A1, 3B and 3C and the inspection illuminators 32 are not shown to clarify the imaging directions and imaging areas by the inspection cameras 31 in the imaging mechanisms 3A1, 3B and 3C.

In the movable tip imaging mechanism 3A1, a base 33A is fixedly arranged with respect to a main body (not shown) of the imaging unit 3 in an orthogonal plane (XY plane in FIG. 4) orthogonal to a vertical direction Z and a supporting plate 34A is provided movably in a horizontal direction X with respect to the base 33A. The mover 35A operates in accordance with a movement command from the control unit 5, whereby the supporting plate 34A is moved in the first horizontal direction X.

The mover 35A includes two guide rails 351, sliders (not shown), and a ball-screw type driver 352. The two guide rails 351 are provided on the upper surface of the base 33A to extend in the first horizontal direction X, and the sliders are mounted on the guide rails movably in the first horizontal direction X. The supporting plate 34A is fixed on the sliders. Further, the driver 352 having a function of moving and positioning the supporting plate 34A in the first horizontal direction X with respect to the base 33A is connected to the supporting plate 34A. The driver 352 is composed of a motor, a ball screw and a nut as conventionally known, and the motor operates in accordance with a command from the control unit 5, whereby the nut moves in the first horizontal direction X together with the supporting plate 34A according to the rotation of the ball screw. In this embodiment, a driving method of the driver 352 is not limited to a ball-screw type driving method and another method, e.g. a linear motor method may be employed.

A plurality of arms 36A stand on the upper surface of this supporting plate 34A, and the inspection cameras 31 and the inspection illuminators 32 are mounted thereon. Thus, the inspection cameras 31 and the inspection illuminators 32 integrally move in the first horizontal direction X according to a movement of the supporting plate 34A by the driver 352 as described above, and illumination positions and imaging positions in the tip imaging mechanism 3A can be adjusted according to the type of the workpiece W.

In the tip imaging mechanism 3A, one fixed inspection camera 31 and two movable inspection cameras 31, 31 are arranged at positions different from each other in the axial direction (vertical direction Z) of the axis of rotation AX3 of the rotating mechanism 24 to image the tooth end Wb1 of the gear Wb in multiple directions from a radially outer side, and imaging directions Da to Dc are different from each other as shown in FIG. 8. To distinguish the inspection cameras 31 in the tip imaging mechanism 3A in the description, the inspection camera 31 whose imaging direction Da is inclined by an angle θa (e.g. 5°) with respect to a horizontal direction Ha is referred to as an "inspection camera 31a", the inspection camera 31 whose imaging direction Db is inclined by an angle θb (e.g. 45°) with respect to the horizontal direction Ha is referred to as an "inspection camera 31b" and the inspection camera 31 whose imaging direction Dc is substantially orthogonal to the horizontal direction Ha is referred to as an "inspection camera 31c" as appropriate below as shown in FIGS. 6 and 8.

Although having the imaging directions Da, Db different from each other, focus positions FA of the inspection cameras 31a, 31b coincide and the inspection cameras 31a, 31b are so positioned in the first horizontal direction X to be located on a pitch circle PC of the gear Wb by the tip driver 35. Thus, the tooth end Wb1 of the gear Wb can be highly accurately imaged from two lateral and oblique directions. Note that although one inspection camera 31c constituting the tip imaging mechanism 3A is fixedly arranged in this embodiment, the inspection camera 31c may be coupled to the supporting plate 34A by a coupling member and the inspection cameras 31a to 31c may be configured to integrally move while causing the focus positions FA thereof to coincide.

Further, in this embodiment, the tooth end Wb1 of the gear Wb is illuminated in multiple directions from the radially outer side to image the tooth end Wb1 located at the focus position FA from the radially outer side. More specifically, the inspection illuminators 32 are divided into three groups (lateral illumination group, oblique illumination group and upper illumination group) and the inspection illuminators 32 are arranged in the respective groups while being separated by a predetermined angular interval along the rotating direction Dw. To distinguish the inspection illuminators 32 in the tip imaging mechanism 3A in the description, three inspection illuminators 32 belonging to the lateral illumination group are respectively referred to as "inspection illuminator 32a", "inspection illuminator 32b" and "inspection illuminator 32c", three inspection illuminators 32 belonging to the oblique illumination group are respectively referred to as "inspection illuminator 32d", "inspection illuminator 32e" and "inspection illuminator 32f" and three inspection illuminators 32 belonging to the upper illumination group are respectively referred to as "inspection illuminator 32g", "inspection illuminator 32h" and "inspection illuminator 32i" as appropriate below.

The inspection illuminators 32a to 32i can be respectively independently lighted on and off by the illumination controller 56 of the control unit 5, but any of the inspection illuminators 32a to 32i spot-illuminates the vicinity of the focus position FA of the inspection cameras 31a to 31c as shown in an upper field of FIGS. 6A and 6B. In this embodiment, any of the inspection illuminators 32a to 32i irradiates illumination light to the gear Wb from a position deviated from an optical axis of the inspection camera 31a to 31c, but part of the illumination light may be irradiated to the gear Wb coaxially with an optical axis of the inspection camera 31a to 31c. This point holds true also for the upstream imaging mechanism 3B and the downstream imaging mechanism 3C to be described next.

The upstream imaging mechanism 3B can image an upstream wall surface extending from a bottom part of a tooth base Wb2 (see FIG. 8) upstream of and adjacent to the tooth end Wb1 in the rotating direction Dw to the tip of the tooth end Wb1 (tooth tip), i.e. an upstream tooth surface Wb3 (see FIG. 8). Further, the downstream imaging mechanism 3C can image a downstream wall surface extending from a bottom part of a tooth base Wb4 (see FIG. 8) downstream of and adjacent to the tooth end Wb1 in the rotating direction Dw to the tip of the tooth end Wb1 (tooth tip), i.e. a downstream tooth surface Wb5 (see FIG. 8). The upstream imaging mechanism 3B and the downstream imaging mechanism 3C have different imaging objects, but have the same basic configuration. Thus, the configuration and operation of the upstream imaging mechanism 3B are described in detail with reference to the figures below, whereas the downstream imaging mechanism 3C is denoted by the same or corresponding reference signs and the configuration thereof is not described.

As shown in FIG. 1, the upstream imaging mechanism 3B is arranged opposite to the tip imaging mechanism 3A across the workpiece W. In the upstream imaging mechanism 3B, six inspection illuminators 32 and two inspection cameras 31 are provided. A predetermined illumination area is spot-illuminated from multiple directions by the inspection illuminators 32 and the upstream tooth surface Wb3 (see FIG. 8) located in the above illumination area, out of the tooth part of the gear Wb of the workpiece W, is imaged from multiple directions by the two inspection cameras 31 and image data of images of the upstream tooth surface Wb3 (hereinafter, referred to as "upstream tooth surface images") is sent to the control unit 5.

More particularly, as shown in FIG. 4, a fixed base 37B is fixedly arranged with respect to the main body (not shown) of the imaging unit 3 and a movable base 33B is provided movably in a second horizontal direction Y orthogonal to both the first horizontal direction X and the vertical direction Z with respect to the fixed base 37B in the upstream imaging mechanism 3B. The mover 38B operates in accordance with a movement command from the control unit 5, whereby the movable base 33B is moved in the second horizontal direction Y.

The mover 38B includes two guide rails 381, sliders (not shown), a ball-screw type driver 382 and the like. The two guide rails 381 are provided on the upper surface of the fixed base 37A to extend in the second horizontal direction Y, and the sliders are mounted on the guide rails movably in the second horizontal direction Y. The movable base 33B is fixed on the sliders. Further, the driver 382 having a function of moving and positioning the movable base 33B in the second horizontal direction Y with respect to the base 37A is connected to the movable base 33B. The driver 382 is composed of a motor, a ball screw and a nut as conventionally known, and the motor operates in accordance with a command from the control unit 5, whereby the nut moves in the second horizontal direction Y together with the movable base 33B according to the rotation of the ball screw.

A supporting plate 34B is provided movably in the first horizontal direction X with respect to the movable base 33B. The mover 35B operates in accordance with a movement command from the control unit 5, whereby the supporting plate 34B is moved in the first horizontal direction X. Note that since the mover 35B has the same configuration as the mover 35A, the same components are denoted by the same or corresponding reference signs and not described.

A plurality of arms 36B stand on the upper surface of this supporting plate 34B, and the inspection cameras 31 and the inspection illuminators 32 are mounted thereon. Thus, the inspection cameras 31 and the inspection illuminators 32 integrally move in a horizontal plane (XY plane) according to a movement of the supporting plate 34B in the first horizontal direction X by the driver 352 and/or a movement of the movable base 33B in the second horizontal direction Y by the driver 358 as described above, and illumination positions and imaging positions in the upstream imaging mechanism 3B can be adjusted according to the type of the workpiece W. Note that a specific adjustment mode is described in detail later.

In the upstream imaging mechanism 3B, as shown in FIGS. 7A and 7B, two inspection cameras 31 are arranged at positions different from each other in the axial direction of the axis of rotation (AX3 in FIGS. 5 and 10A-10C) of the rotating mechanism 24 to image the upstream tooth surface Wb3 of the gear Wb in multiple directions from a side tangentially outward of the pitch circle PC, and imaging directions Dd, De are different from each other. To distinguish the inspection cameras 31 in the upstream imaging mechanism 3B in the description, the inspection camera 31 whose imaging direction Dd is inclined by an angle (e.g. 5°) with respect to a horizontal direction Hb is referred to as an "inspection camera 31d" and the inspection camera 31 whose imaging direction De is inclined by an angle (e.g. 45°) with respect to the horizontal direction Hb is referred to as an "inspection camera 31e" as appropriate below as shown in FIG. 8.

Although having the imaging directions Dd, De different from each other in this way, focus positions FB of the inspection cameras 31d, 31e coincide and the inspection cameras 31d, 31e are so positioned in the horizontal plane (XY plane) to be located on the pitch circle PC of the gear Wb by the two drivers 352, 358. Thus, the upstream tooth surface Wb3 can be highly accurately imaged from two lateral and oblique directions from the side tangentially outward of the pitch circle PC.

Further, in this embodiment, the upstream tooth surface Wb3 of the gear Wb is illuminated in multiple directions from a tangentially outer side to image the upstream tooth surface Wb3 located at the focus position FB from the tangentially outer side. More specifically, the inspection illuminators 32 are divided into two groups (lateral illumination group and oblique illumination group) and arranged in the respective groups while being separated by a predetermined angular interval along the rotating direction Dw. To distinguish the inspection illuminators 32 in the upstream imaging mechanism 3B in the description, three inspection illuminators 32 belonging to the lateral illumination group are respectively referred to as "inspection illuminator 32j", "inspection illuminator 32k" and "inspection illuminator 32l", and three inspection illuminators 32 belonging to the oblique illumination group are respectively referred to as "inspection illuminator 32m", "inspection illuminator 32n" and "inspection illuminator 32o" as appropriate below.

The inspection illuminators 32j to 32o can be respectively independently lighted on and off by the illumination controller 56 of the control unit 5, but any of the inspection illuminators 32j to 32o also spot-illuminates the vicinity of the focus position FB of the inspection cameras 31d, 31e as shown in an upper field of FIG. 7. In this embodiment, any of the inspection illuminators 32j to 32o also irradiates illumination light to the upstream tooth surface Wb3 from a position deviated from an optical axis of the inspection camera 31e, 31d, but part of the illumination light may be irradiated to the upstream tooth surface Wb3 coaxially with the optical axis of the inspection camera 31a to 31c.

Figure 9:
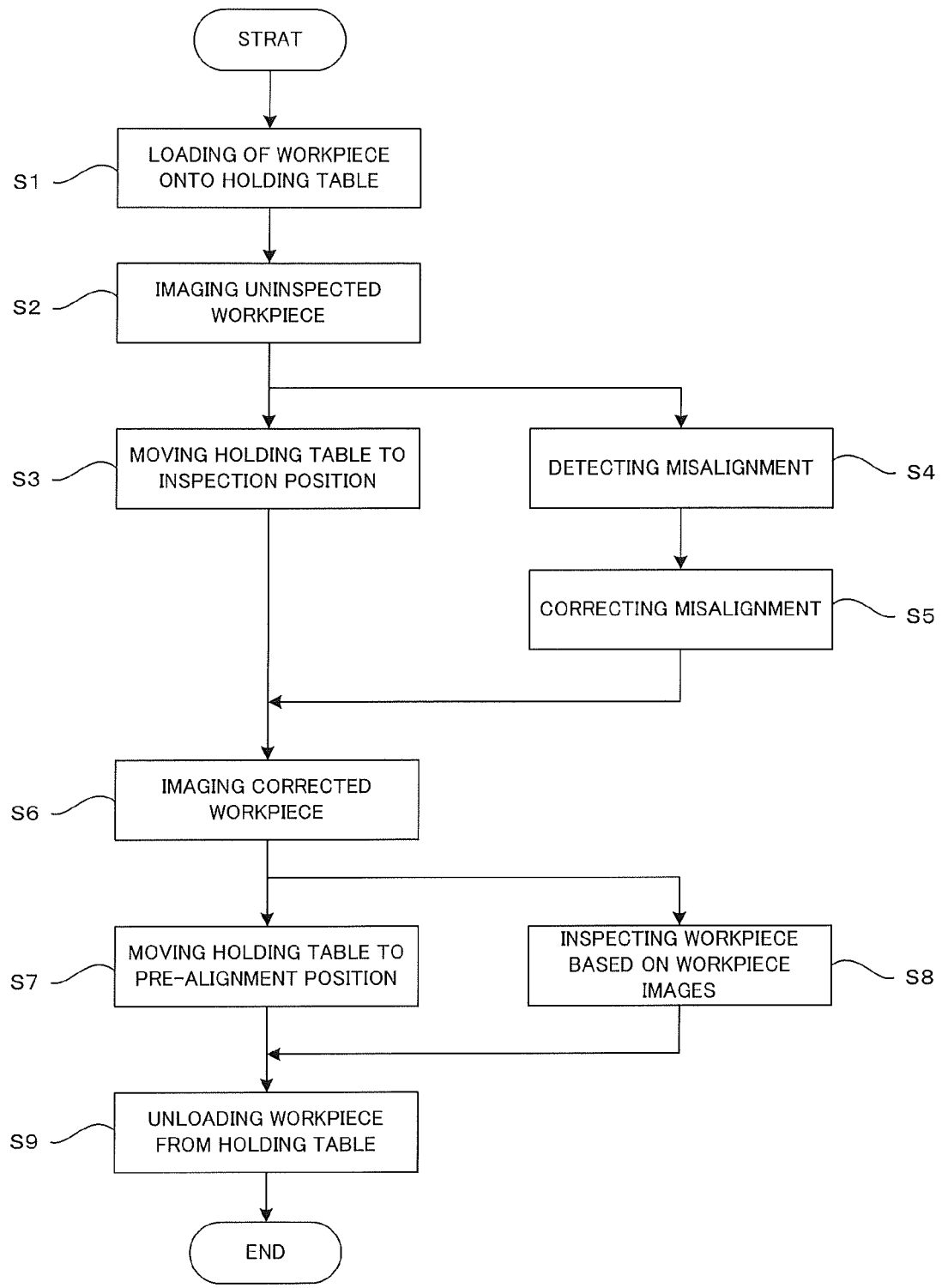
FIG. 9 is a flowchart showing the operation of inspecting a workpiece by the inspection apparatus in FIG. 1.

FIG. 9 is a flowchart showing the operation of inspecting a workpiece by the inspection apparatus in FIG. 1. FIGS. 10A-10C schematically shows the inspecting operation. To clearly distinguish the operations of the holding tables 21A and 21B in FIGS. 10A-10C, dots are given to the holding table 21B and a workpiece W held by the holding table 21B.

In the inspection apparatus 100, according to the inspection program stored in advance in the memory 52 of the control unit 5, the arithmetic processor 51 controls each part of the apparatus to execute the following operations. Here, various operations performed on the workpiece W will be described focusing on one workpiece W with reference to FIGS. 9 and 10A-10C. When the control unit 5 confirms that there is no workpiece W at the holding table 21A located at the pre-alignment position PA as shown in FIG. 10A and that the workpiece detection sensor 11 detects an uninspected workpiece W housed in the workpiece housing of the loading unit 1, the control unit 5 starts loading of the workpiece W onto the holding table 21A (step S1). In this loading step, the loader 12 grasps the uninspected workpiece W located in the workpiece housing and carries the uninspected workpiece W from the loading unit 1 to the holding table 21A. In the embodiment, for smoothly performing the loading step and a subsequent step of detecting misalignment, before the workpiece W is carried to the holding table 21A, the control unit 5 performs preparation for accepting the workpiece W in which the center axis AX2 of the chuck mechanism 22 and the rotary axis AX3 of the motor 241 are matched with each other by the horizontal positioning mechanism 23 as shown in FIG. 10A and the three movable members 221 to 223 are moved to get away from each other.

When the workpiece W is carried to the holding table 21A by the loader 12, the chuck mechanism 22 moves the three movable members 221 to 223 to get closer to each other as described above to pinch a part of the shaft Wa of the workpiece W and grasp the workpiece W. More specifically, during the loading operation, the movable members 221 to 223 are moved to get closer each other. While the respective upper end surfaces and the respective projection members 225 of the movable members 221 to 223 are engaged with the stepped part of the shaft Wa to match the center axis AX2 of the chuck mechanism 22 and the axis of the shaft Wa with each other, the workpiece W is held (see the section (b) of FIG. 10B). In this way, the loading step is finished. At the time of the finish, the rotary axis AX3 of the motor 241, the center axis AX2 of the chuck mechanism 22, and the axis of the shaft Wa are matched with each other. However, in some case that the workpiece W is manufactured by forging or casting, the symmetry axis AX4 of the gear Wb is displaced from the axis of the shaft Wa to cause misalignment of the workpiece W with respect to the motor 241 as shown in FIG. 10B, for example.

In this regard, in the embodiment, the uninspected workpiece W is illuminated by the alignment illuminator 28 (FIG. 2) and an image of the gear Wb is captured by the alignment camera 27 while the uninspected workpiece W is rotated by the motor 241 of the holding table 21A. Data about the image is stored into the memory 52 (step S2).

After this imaging is finished, the turning driver 262 makes a switch from the first position to the second position. More specifically, the turning driver 262 turns the support plate 261 180 degrees about the turning axis AX1. By doing so, as shown in the section (c) of FIG. 10, the holding table 21A holding the uninspected workpiece W is moved from the pre-alignment position PA to the inspection position PI and the elevator 254 moves the workpiece W to a height position at which an image of the workpiece W can be captured by the imaging unit 3 (step S3).

In the embodiment, in parallel with the foregoing movements, the image data about the workpiece W is read from the memory 52 and misalignment of the workpiece W with respect to the rotary mechanism 24 (motor 241) is detected (step S4). In the embodiment, the misalignment corresponds to information containing a displacement amount Δ and a displacement direction. Next, the misalignment is corrected at the holding table 21A (step S5). This misalignment correction is made by moving the chuck mechanism 22 using the horizontal positioning mechanism 23 so as to eliminate the misalignment detected in step S4 described above. By doing so, as shown in FIG. 10C, the symmetry axis of the gear Wb and the rotary axis of the motor 241 are matched with each other at the time of arrival of the holding table 21A at the inspection position PI, or before or after the arrival. Thus, a workpiece imaging step (step S6) can be started immediately.

In step S6, the rotary mechanism 24 of the holding table 21A located at the inspection position PI is actuated to start workpiece rotation (corresponding to an example of a "rotating step" of the invention). In this step, the workpiece W held by the holding table 21A is in a so-called aligned state, which has undergone the foregoing misalignment correction, and rotates about the symmetry axis AX4. In response to this rotation, the plurality of inspection illuminators 32 are turned on to illuminate the rotating workpiece W from multiple directions. While the inspection illuminators 32 are turned on after the workpiece rotation, this is not the only timing for the turning-on. The turning-on of the inspection illuminators 32 may be started simultaneously with start of the rotation or before start of the rotation.

While the workpiece W is rotated and illuminated in this way, the plurality of inspection cameras 31 image the workpiece W from various directions and sends image data of images of the workpiece W from a plurality of directions to the control unit 5 (corresponding to an example of an "image obtaining step" of the invention). Specifically, the inspection cameras 31a to 31c of the tip imaging mechanism 3A image the tooth end Wb1 of the gear Wb in three directions from lateral, oblique and upper radially outer sides. Further, the inspection cameras 31d, 31e of the upstream imaging mechanism 3B image the upstream tooth surface Wb3 in two lateral and oblique directions from the side tangentially outward of the pitch circle PC. Furthermore, the inspection cameras 31f, 31g of the downstream imaging mechanism 3C image the downstream tooth surface Wb5 in two lateral and oblique directions from the side tangentially outward of the pitch circle PC. In this way, tip images, upstream tooth surface images and downstream tooth surface images are obtained multidirectionally as the images of the workpiece W, and those pieces of the image data are sent to the control unit 5. On the other hand, in the control unit 5, the above image data is stored in the memory 52, and the workpiece W is inspected based on this image data at the following timing (corresponding to an example of an "inspecting step" of the invention).

After the images are acquired in this way, the workpiece rotation is stopped at the holding table 21A, and the inspection illuminators 32 are turned off at the imaging unit 3. Further, the turning driver 262 turns the support plate 261 reversely 180 degrees about the turning axis AX1. By doing so, the holding table 21A is moved from the inspection position PI to the pre-alignment position PA while holding the inspected workpiece W. Further, the elevator 254 moves the workpiece W to its original height position (step S7). In parallel with this movement of the workpiece W, the control unit 5 reads the image data from the memory 52, and determines the presence or absence of scratches, defects, etc. at the gear Wb on the basis of the read workpiece images (=tip images+upstream tooth surface images+downstream tooth surface images). In this way, workpiece inspection is conducted on the workpiece W held by the holding table 21A (step S8).

The workpiece W having returned to the pre-alignment position PA is grasped by the unloader 42. Thereafter, the workpiece W is released from the grasp by the movable members 221 to 223. Thus, the transfer of the workpiece W from the holding table 21A to the unloader 42 is carried out. Next, the unloader 42 carries the workpiece W to the unloading unit 4 and houses the workpiece W into the workpiece housing (not shown in the drawings) (step S9). The foregoing sequence of steps (steps S1 to S9) is performed repeatedly and alternately by the holding tables 21A and 21B.

As described above, in this embodiment, the dedicated tip imaging mechanism 3A, upstream imaging mechanism 3B and downstream imaging mechanism 3C are respectively provided to image the tip of the tooth end Wb1 (tooth tip), the upstream tooth surface Wb3 and the downstream tooth surface Wb5 of the workpiece W, and a tip image, an upstream tooth surface image and a downstream tooth surface image are individually obtained. Accordingly, even for workpieces W whose upstream tooth surface image and downstream tooth surface image have been conventionally difficult to capture by a single camera, the upstream tooth surface image and the downstream tooth surface image can be reliably obtained. Further, as compared to the conventional technique for collectively capturing the tip image, the upstream tooth surface image and the downstream tooth surface image by the single camera, each image can be clearly captured. Since the workpiece W is inspected based on these images, various workpieces W can be highly accurately inspected.

Further, in the above embodiment, the imaging directions are made different for each imaging object. That is, the tip imaging mechanism 3A is arranged to image the tip of the tooth end Wb from the side radially outward of the workpiece W, whereas the upstream imaging mechanism 3B and the downstream imaging mechanism 3C are arranged to respectively image the tooth surfaces Wb3, Wb5 from the side tangentially outward of the pitch circle PC. Thus, the tip image, the upstream tooth surface image and the downstream tooth surface image can be reliably captured and inspection accuracy can be enhanced.

Further, in the above embodiment, the focus position of the inspection cameras 31 is located on the pitch circle PC in any of the tip imaging mechanism 3A, the upstream imaging mechanism 3B and the downstream imaging mechanism 3C. Thus, the tip image, the upstream tooth surface image and the downstream tooth surface image can be captured in a focused state and inspection accuracy can be enhanced.

Further, in any of the tip imaging mechanism 3A, the upstream imaging mechanism 3B and the downstream imaging mechanism 3C, the plurality of inspection cameras 31 are arranged at the positions different from each other in the axial direction of the axis of rotation AX3 of the rotating mechanism 24, and the workpiece W is imaged from the imaging directions different from each other. By imaging the workpiece W from multiple directions in this way, various workpieces W can be dealt with and the versatility of the inspection apparatus 100 can be enhanced.

Further, since the upstream imaging mechanism 3B and the downstream imaging mechanism 3C are arranged opposite to the tip imaging mechanism 3A across the workpiece W as shown in FIG. 5, a multitude of the inspection cameras 31 and a multitude of the inspection illuminators 32 can be installed and various workpieces W can be highly accurately inspected.

Further, in the above embodiment, any of the inspection cameras 31a to 31g is arranged at a position higher than the pitch circle PC in the vertical direction, and any of the imaging directions Da to Dg is facing downward. That is, any of the inspection cameras 31a to 31g is installed with a light receiving surface (not shown) faced down. Thus, the adhesion of dust, dirt and the like to the light receiving surfaces can be effectively suppressed, the workpiece W can be satisfactorily imaged and high maintainability can be obtained.

Figure 11A:
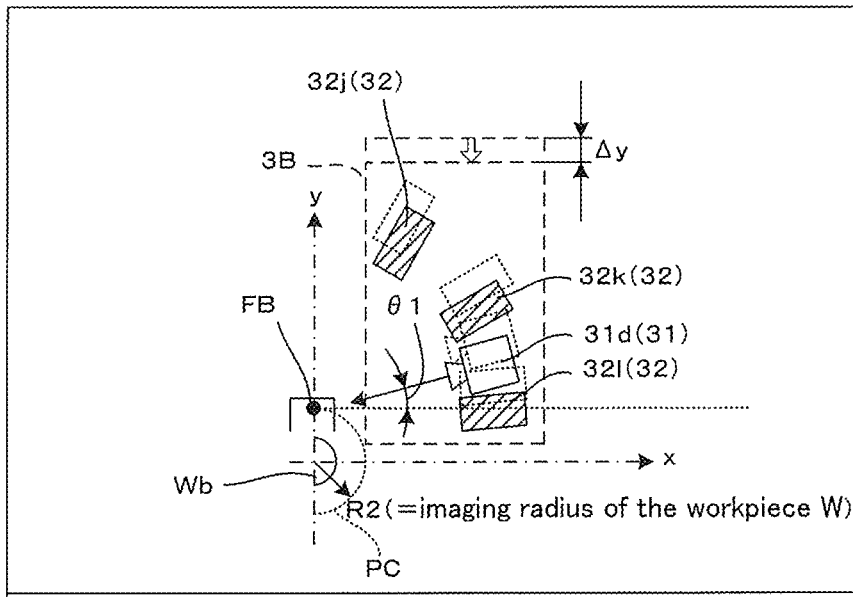
FIGS. 11A-11C schematically show moving operations of upstream imaging mechanism according to a change in the type of the workpiece and the imaging condition.

Furthermore, the upstream imaging mechanism 3B can parallelly move the inspection cameras 31 and the inspection illuminators 32 integrally in the horizontal plane (XY plane) by the drivers 352, 358, and can be positioned at a position corresponding to the type of the workpiece W and imaging conditions by being parallelly moved (corresponding to an example of a "positioning step" of the invention). After this positioning, the workpiece W is imaged. Thus, even if the type of the workpiece W and/or the imaging conditions are changed, an upstream tooth surface can be constantly imaged from proper directions by the upstream imaging mechanism 3B and upstream tooth surface images can be satisfactorily captured. For example, in the case of inspecting a workpiece W having a different diameter, the driver 382 of the mover 38B may be operated. For example, if an imaging radius of the workpiece W is changed from an original radius R1 (see FIG. 11B) to a radius R2 as shown in FIG. 11A, the upstream imaging mechanism 3B may be parallelly moved in the second horizontal direction Y to satisfy:

$$x^2+y^2=R2^2, \text{ and}$$

$$x=0.$$

Figure 11B:
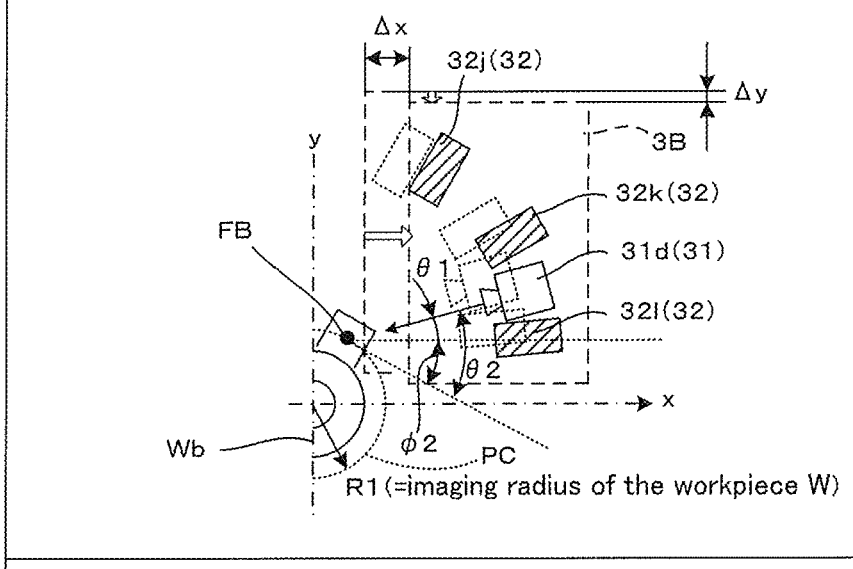

Further, in the case of inspecting the workpiece W by imaging the workpiece W under different imaging condition without changing the type of the workpiece W, the driver 352 of the mover 35B and the driver 382 of the mover 38B may be operated. For example, if an imaging angle of the workpiece W is changed from an original imaging angle $\phi 1$ (see FIG. 11A) to an imaging angle $\phi 2$ as shown in FIG. 11B, the upstream imaging mechanism 3B may be parallelly moved in the horizontal directions X, Y to satisfy:

$$x^2+y^2=R1^2, \text{ and}$$

$$\tan \phi 2 = \Delta\Delta x/\Delta y.$$

Figure 11C:
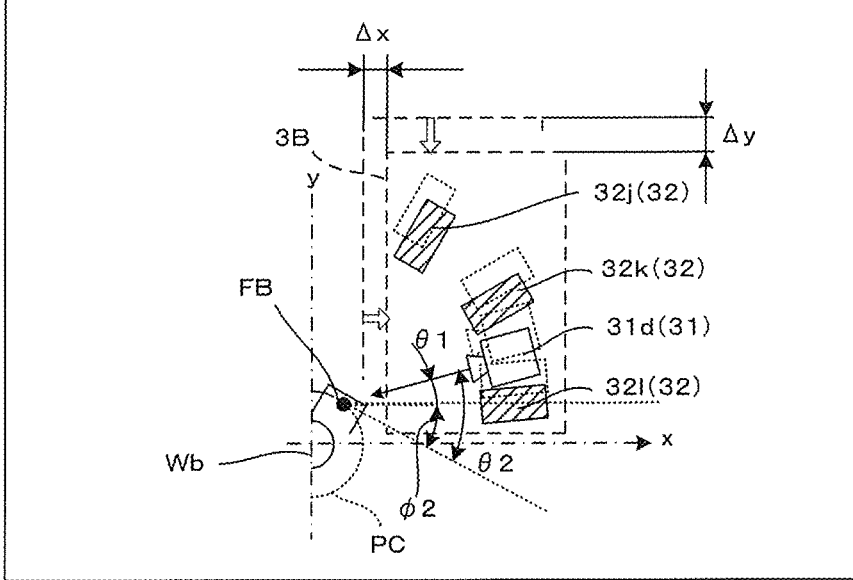

Further, also when both of the above changes occur, the driver 352 of the mover 35B and the driver 382 of the mover 38B may be operated. For example, the upstream imaging mechanism 3B may be parallelly moved in the horizontal directions X, Y as shown in FIG. 11C to satisfy:

$$x^2+y^2=R2^2, \text{ and}$$

$$\tan \phi 2 = \Delta x/\Delta y.$$

Note that these points hold true also for the downstream imaging mechanism 3C.

As described above, in this embodiment, the tooth end Wb1, the tooth base Wb2, the upstream tooth surface Wb3, the tooth base Wb4 and the downstream tooth surface Wb5 of the gear Wb respectively correspond to examples of a "projection", a "recess upstream of and adjacent to the projection", an "upstream wall surface", a "recess downstream of and adjacent to the projection" and a "downstream wall surface" of the invention, and the upstream tooth surface image and the downstream tooth surface image respectively correspond to examples of an "upstream wall surface image" and a "downstream wall surface image" of the invention. Further, the inspection cameras 31a to 31c correspond to examples of "tip imagers" of the invention, the inspection cameras 31d, 31e correspond to examples of "upstream imagers" of the invention, and the inspection cameras 31f, 31g correspond to examples of "downstream imagers" of the invention. Further, the arithmetic processor 51 of the control unit 5 functions as an "inspection unit" of the invention. Further, the pitch circle PC corresponds to examples of an "upstream locus" and a "downstream locus" of the invention, and the focus positions FB, FC respectively correspond to examples of an "upstream focus position" and a "downstream focus position" of the invention.

Note that the invention is not limited to the above embodiment and various changes other than the aforementioned ones can be made without departing from the gist of the invention. For example, although the pitch circle PC is used as the upstream locus drawn by the upstream tooth surface Wb3 by the rotation of the workpiece W in the above embodiment, the upstream locus is not limited to this. For example, a locus drawn by one arbitrary point of the upstream tooth surface Wb3 may be used. This point holds true also for the downstream locus. Further, although the pitch circle PC is commonly used as the "upstream locus" and the "downstream locus" of the invention in the above embodiment, it goes without saying that an upstream locus and a downstream locus different from each other may be used.

Further, although the workpiece W including the gear Wb is an object to be inspected in the above embodiment, the type of the workpiece W is not limited to this. "Workpieces" of the invention include workpieces in general including an outer peripheral part which has a rotationally symmetric shape about an axis of symmetry and in which projections and recesses are cyclically repeatedly provided.

Further, although the workpiece W is held by three movable members 221 to 223 in the above embodiment, the holding mode and holding method of the workpiece W are arbitrary. Further, although the invention is applied to the inspection apparatus 100 for detecting a misalignment by alternately locating two holding tables 21A, 21B at the pre-alignment position PA in the above embodiment, the invention can be applied also to an inspection apparatus including one, three or more holding tables. Further, the invention can be applied also to an apparatus for detecting a misalignment at an inspection position, for example, using the inspection camera 31c also as an alignment camera.

Further, although the numbers of the inspection cameras 31 installed in the tip imaging mechanism 3A, the upstream imaging mechanism 3B and the downstream imaging mechanism 3C are respectively "three", "two" and "two" in the above embodiment, the numbers of the installed inspection cameras 31 are not limited to these and at least one inspection camera may be installed in each of the above imaging mechanisms. In this respect, at least one or more inspection illuminators may be installed in each of the tip imaging mechanism 3A, the upstream imaging mechanism 3B and the downstream imaging mechanism 3C, similarly to the inspection cameras 31.

Further, although the plurality of inspection illuminators 32 are collectively lighted on in the above embodiment, the workpiece W may be rotated a plurality of number of times and imaged with the inspection illuminators 32 to be lighted on during each rotation switched. Thus, the tip image, the upstream tooth surface image and the downstream tooth surface image can be obtained under various illumination conditions and various appearance defects can be imaged in an emphasized manner.

Furthermore, the inspection method based on the tip image, the upstream tooth surface image and the downstream tooth surface image is conventionally frequently used, but images of good products may be, for example, registered in the memory 52 in advance and inspection may be carried out by comparison with the images of the good products. Further, inspection may be carried out based on feature quantities included in the tip image, the upstream tooth surface image and the downstream tooth surface image or machine learning may be used.

Although the invention has been described by way of the specific embodiments above, this description is not intended to be interpreted in a limited sense. By referring to the description of the invention, various modifications of the disclosed embodiments will become apparent to a person skilled in this art similarly to other embodiments of the invention. Hence, appended claims are thought to include these modifications and embodiments without departing from the true scope of the invention.

INDUSTRIAL APPLICABILITY

This invention can be applied to inspection techniques in general for inspecting a workpiece including an outer peripheral part which has a rotationally symmetric shape about an axis of symmetry and in which projections and recesses are cyclically repeatedly provided.

REFERENCE SIGNS LIST 3A tip imaging mechanism
3B upstream imaging mechanism
3C downstream imaging mechanism
5 control unit (inspection unit)
21A, 21B holding table
31a-31C inspection camera (tip imager)
31d, 31e inspection camera (upstream imager)
31f, 31g inspection camera (downstream imager)
35B, 35C, 38C, 38C mover
51 arithmetic processor (inspection unit)
100 inspection apparatus
AX3 rotary axis (of motor 241)
AX4 symmetry axis
Dw rotating direction (of workpiece)
FB (upstream) focus position
FC (downstream) focus position
PC pitch circle (upstream locus, downstream locus)
W workpiece
Wb1 tooth end (projection)
Wb2, Wb4 tooth base (recess)
Wb3 upstream tooth surface (upstream wall surface)
Wb5 downstream tooth surface (downstream wall surface) 5 control unit (inspection part)

The invention claimed is:

1. An inspection apparatus that inspects a workpiece including an outer peripheral part which has a rotationally symmetric shape about an axis of symmetry and in which projections and recesses are cyclically repeatedly provided, the inspection apparatus comprising:
   a holding table that rotates the workpiece about an axis of rotation with the axis of symmetry caused to coincide with the axis of rotation while holding the workpiece;
   a tip imaging mechanism that images a tip of the projection of the workpiece in rotation;
   an upstream imaging mechanism that includes an upstream illuminator and an upstream imager and images an upstream wall surface extending from a bottom part of the recess upstream of and adjacent to the projection in a rotating direction of the workpiece to the tip of the projection by the upstream imager while illuminating the upstream wall surface by the upstream illuminator;
   a downstream imaging mechanism that images a downstream wall surface extending from a bottom part of the recess downstream of and adjacent to the projection in the rotating direction to the tip of the projection; and
   an inspection unit that inspects the workpiece based on images captured by the tip imaging mechanism, the upstream imaging mechanism and the downstream imaging mechanism,
   wherein the upstream imaging mechanism including a mover for parallelly and integrally moving and positioning the upstream imager and the upstream illuminator in a first horizontal direction and a second horizontal direction which intersect with each other in an orthogonal plane orthogonal to the axis of symmetry.

2. The inspection apparatus according to claim 1, wherein the upstream imager images the upstream wall surface from a side tangentially outward of an upstream locus drawn by the upstream wall surface by the rotation of the workpiece.

3. The inspection apparatus according to claim 1, wherein an upstream focus position of the upstream imager is located on an upstream locus drawn by the upstream wall surface by the rotation of the workpiece.

4. An inspection apparatus that inspects a workpiece including an outer peripheral part which has a rotationally symmetric shape about an axis of symmetry and in which projections and recesses are cyclically repeatedly provided, the inspection apparatus comprising:
  a holding table that rotates the workpiece about an axis of rotation with the axis of symmetry caused to coincide with the axis of rotation while holding the workpiece;
  a tip imaging mechanism that images a tip of the projection of the workpiece in rotation;
  an upstream imaging mechanism that images an upstream wall surface extending from a bottom part of the recess upstream of and adjacent to the projection in a rotating direction of the workpiece to the tip of the projection;
  a downstream imaging mechanism that images a downstream wall surface extending from a bottom part of the recess downstream of and adjacent to the projection in the rotating direction to the tip of the projection; and
  an inspection unit that inspects the workpiece based on images captured by the tip imaging mechanism, the upstream imaging mechanism and the downstream imaging mechanism,
  wherein at least one of the upstream imaging mechanism and the downstream imaging mechanism including a mover for parallelly moving and positioning the imaging mechanism in an orthogonal plane orthogonal to the axis of symmetry and imaging the workpiece from a position radially outward of the workpiece and positioned by the mover,
  wherein the upstream imaging mechanism includes an upstream imager for imaging the upstream wall surface by locating an upstream focus position on an upstream locus drawn by the upstream wall surface by the rotation of the workpiece,
  wherein the upstream imaging mechanism includes a plurality of the upstream imagers, and
  wherein the plurality of upstream imagers are arranged at positions different from each other in an axial direction of the axis of rotation and image the upstream wall surface at angles different from each other with respect to the upstream focus position.

5. The inspection apparatus according to claim 1, wherein the downstream imaging mechanism includes a downstream imager, a first downstream mover for moving the downstream imager in the first horizontal direction, and a second downstream mover for moving the downstream imager in the second horizontal direction, and
  the downstream imager images the downstream wall surface from a side tangentially outward of a downstream locus drawn by the downstream wall surface by the rotation of the workpiece.

6. The inspection apparatus according to claim 5, wherein the downstream imaging mechanism includes a downstream imager for imaging the downstream wall surface by locating a downstream focus position on the downstream locus.

7. The inspection apparatus according to claim 6, wherein the downstream imaging mechanism includes a plurality of the downstream imagers, and the plurality of downstream imagers are arranged at positions different from each other in an axial direction of the axis of rotation and image the downstream wall surface at angles different from each other with respect to the downstream focus position.

8. The inspection apparatus according to claim 1, wherein:
  the tip imaging mechanism includes a plurality of tip imagers for imaging the tip of the projection from a side radially outward of the workpiece, and
  the plurality of tip imagers are arranged at positions different from each other in an axial direction of the axis of rotation and image the tip of the projection at angles different from each other.

9. The inspection apparatus according to claim 8, wherein the upstream imaging mechanism and the downstream imaging mechanism are arranged opposite to the tip imaging mechanism across the workpiece.

10. An inspection method for inspecting a workpiece including an outer peripheral part which has a rotationally symmetric shape about an axis of symmetry and in which projections and recesses are cyclically repeatedly provided, the method comprising:
  a rotating step of rotating the workpiece about an axis of rotation with the axis of symmetry caused to coincide with the axis of rotation while holding the workpiece;
  a positioning step of
    parallelly and integrally moving and positioning an upstream imager and an upstream illuminator of an upstream imaging mechanism in a first horizontal direction and a second horizontal direction which intersect with each other in an orthogonal plane orthogonal to the axis of symmetry, so that the upstream imaging mechanism images an upstream wall surface extending from a bottom part of the recess upstream of and adjacent to the projection in a rotating direction of the workpiece to a tip of the projection, and
    parallelly moving a downstream imaging mechanism for imaging a downstream wall surface extending from a bottom part of the recess downstream of and adjacent to the projection in the rotating direction to the tip of the projection in the orthogonal plane on a side radially outward of the workpiece;
  an image obtaining step of, after the positioning step, obtaining a tip image by imaging the tip of the projection of the workpiece rotating about the axis of rotation by a tip imaging mechanism, obtaining an upstream wall surface image by imaging the upstream wall surface extending from the bottom part of the recess upstream of and adjacent to the projection in the rotating direction of the workpiece to the tip of the projection by the upstream imager while illuminating the upstream wall surface by the upstream illuminator, and obtaining a downstream wall surface image by imaging the downstream wall surface extending from the bottom part of the recess downstream of and adjacent to the projection in the rotating direction to the tip of the projection by the downstream imaging mechanism; and
  an inspecting step of inspecting the workpiece based on the tip image, the upstream wall surface image and the downstream wall surface image.

* * * * *